Figure 1:
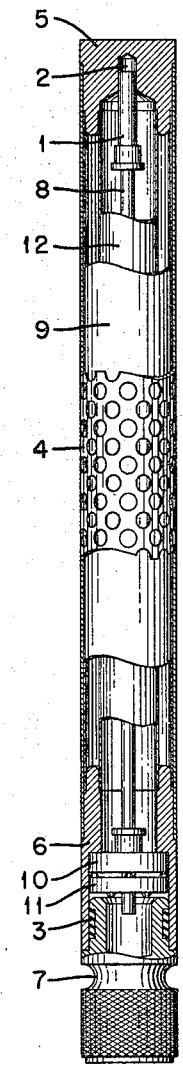

Feb. 24, 1959        R. D. BIRKHOFF ET AL        2,875,343
PERSONNEL DOSIMETER
Filed March 14, 1957

INVENTORS.
Robert D. Birkhoff
BY  Harry H. Hubbell, Jr.
Raymond M. Johnson

ATTORNEY

3 2,875,343

PERSONNEL DOSIMETER

Robert D. Birkhoff, Knoxville, and Harry H. Hubbell, Jr., Oak Ridge, Tenn., and Raymond M. Johnson, Jr., Pittsburgh, Pa., assignors to the United States of America as represented by the United States Atomic Energy Commission Application March 14, 1957, Serial No. 646,182

5 Claims. (Cl. 250—83.3)

The present invention relates to personnel dosimeters, and more especially to a novel personnel dosimeter which is sensitive to both gamma and beta radiation.

In certain radiochemical laboratories and during nuclear weapons tests, the radiation exposure dose to personnel due to beta rays may reach dangerous levels, even though the readings of the pocket dosimeters carried by personnel are below the maximum permissible level. Present personnel dosimeters will not indicate the presence of soft or low energy beta rays because their walls are so thick that they absorb the weak beta rays before they can penetrate into the sensitive volume of the chamber. Dosimeters have in the past required such thick walls because they must possess sufficient structural strength to withstand rough handling in the field, and also because it was assumed that the walls should be sufficiently thick so that gamma rays would reach equilibrium with their secondary electrons. Consequently, workers carrying only the standard pocket chambers have been unaware of possible radiation danger due to the soft beta radiations.

Accordingly, it is a primary object of this invention to provide a pocket dosimeter or ionization chamber which is sensitive to both gamma and beta radiations. Another object of this invention is to provide a beta-sensitive pocket dosimeter which is rugged and strong in construction so that it may be carried on the person of one who is exposed to ionizing radiations. A further object of the invention is to provide a true personnel dosimeter; that is, a device having a response which will approximate the dose received by the basal layer of the epidermis, taking into account the natural shielding of the outer layers of skin, in order to provide a more accurate indication of the dosage to human tissue due to both beta and gamma radiations.

Other objects and advantages of this invention will become apparent from the following detailed description of a preferred embodiment thereof, when read in conjunction with the appended drawing, which is an actual size, sectional, partially cut away drawing of one embodiment of our dosimeter.

In accordance with this invention, a sensitive ionization chamber volume is defined by an electrically conducting cylinder surrounding a central electrode. The cylinder is formed from a material of low atomic number, such as electrically conducting paper or a thin waterproof plastic which is rendered electrically conducting. For example, the plastic cylinder may be coated with colloidal graphite ("aquadag") for conductivity. The thickness of the cylinder plus its coating is substantially 7 milligrams per square centimeter (7 mg./cm.$^2$), to provide a shield corresponding to that over the basal layer of the human epidermis. Surrounding the ionization chamber is a second coaxial cylinder of a thin perforated sheet, having a known ratio of void area to sheet area. For convenience in calibration and use of the dosimeter and also for structural purposes, this ratio is most appropriately chosen to be 50% voids. Substantially 50% of the incident low energy beta radiation and a greater percentage of the higher energy beta radiation will pass through the void space and the thin inner walls and enter the ionization region, so that the chamber will read the total gamma radiation dose plus at least 50% of the beta radiation dose. Up to about 90% of the high energy betas will pass through the walls and void space.

An ideal personnel dosimeter would indicate the beta and gamma radiation received, would be very light (less than one ounce), would be structurally sturdy so that accidental dropping or jarring would not affect the accuracy of its readings, would be resistant to accidental exposure to laboratory chemicals and water, would be accurate, would be small and convenient to carry, and would be inexpensive to manufacture, since large numbers are needed. The instrument which we have invented approximates these requirements in that it weighs about ½ ounce, is fairly rugged, is as convenient to carry as a fountain pen, can be dropped on concrete without discharging, may be accurately calibrated, and is relatively inexpensive to make.

Referring now to the attached figure, the outer wall of the dosimeter comprises a perforated cylinder 4. The upper end of body 4 is sealed by a plug 5 which contains a central recess 2 for receiving insulator 1. The opposite end of wall 4 is carried by hollow end plug 6 which is provided with an internal shoulder for receiving insulator disc 10. Cap 7 is removably inserted into the lower end of the hollow portion of plug 6 and sealed with a rubber gasket 3. The center electrode 8 is a metal rod surrounded at one end by the insulator sleeve 1 and at the opposite by an insulator sleeve and a disc 10 which seats on a shoulder in plug 6. A portion of the electrode 8 extends through the disc 10 and through a plastic friction-fitting washer 11 into the central cavity in the cap 7. When the cap is removed and the dosimeter is placed on a standard charger-reader such as the Victoreen Minometer, the electrode extension makes contact with the central electrode of the charger-reader. The ionization chamber is defined by a thin electrically conducting paper cylinder 12 disposed concentrically about electrode 8. Opposite ends of the paper chamber may be cemented inside the recesses provided in plugs 5, 6. A second paper or plastic cylinder 9 may be provided concentric with chamber 12, if desired, and supported by external shoulders on plugs 6, 7, or the second cylinder may be omitted.

The combined thicknesses of cylinders 9, 12, if both are provided, or the thickness of the cylinder 9, where it alone is used, is substantially 7 mg./cm.$^2$, corresponding to the accepted value for the thickness of the skin over the basal layer of the epidermis. The chamber may be made from electrically conductive paper or from a thin, waterproof plastic coated to be electrically conducting. If the 7 mg./cm.$^2$ of the shield around the sensitive volume is divided into inner and intermediate paper or plastic cylinders, the intermediate one need not be made conductive, of course. It has been found that screen is not suitable for use as the outer wall 4 because it is not sufficiently strong unless the wire junctions are welded. A drilled plastic outer wall has been used, but it has been found that beta radiation not incident normal to and directed at the center electrode will be partially or wholly absorbed by the plastic wall around the drilled holes. This "penumbra effect" will change the spectrum of the radiation and render the calculation of the theoretical dose rate in the center of the sensitive volume both difficult and impractical. Use of iron screen is not desirable because of the bad photo-electron peak due to gamma radiation from 50 to 200 kev.

The wall 4 may be formed from a perforated sheet of thickness dependent upon the strength of the material. For most purposes, a thickness of .010–.020 inch is preferred. The diameter of the holes should be large compared with the wall thickness to avoid the penumbra effect above described. The shape of the holes is not critical. Greater wall thickness reduces the energy dependence of response, but will also reduce sensitivity if the walls are too thick. The wall 4 should be formed from a material of low atomic number which is structurally strong. Aluminum and magnesium and their alloys which contain little or no metals of atomic number higher than that of aluminum have been found satisfactory. No more than approximately 5% copper, iron, zinc or other high-metals should be present in the alloys for most accurate results. The 24ST alloy of aluminum has proved suitable and is preferred.

Dosimeters without the intermediate cylinder 9 are eminently satisfactory. If two paper or plastic cylinders are provided, however, the inner cylinder serves as the ionization chamber wall while the outer one may serve to waterproof the device. For example, the outer wall 4 may be dipped in plastic to form a thin coat inside and out of the wall 4, rather than having a separate cylinder 9 fabricated and inserted. The advantage of water-proofing by dividing the 7 mg./cm.$^2$ thickness into two cylinders may be balanced against the convenience of having only one such cylinder and having it located away from the outer wall so that a dent in the outer wall would not rupture it. In any event, in our improved dosimeter, the outer wall is not the ionization chamber wall, so that our dosimeter is less susceptible to loss of reading due to the frequent external shock or damage to the outer wall.

In operation, the end cap is removed and the dosimeter is charged in a conventional charger. It may be charged to about 150 volts, for example. The end cap is then replaced and the dosimeter is given to the person who is to carry it. At the end of the allowed working time or as desired, the wearer returns the device to be read on a conventional dosimeter reader. The reading obtained will be the total of the gamma radiation plus at least one-half the actual beta radiation received, when the sheet wall contains 50% void space. If a second conventional dosimeter is also carried, the total gamma dose may be obtained from it and then subtracted from the indication of the beta-gamma dosimeter to obtain the 50% beta dose reading. If it is known that the wearer were exposed only to beta radiation, then the reading may be multiplied by two to give the total beta dose received.

Our novel dosimeter may be calibrated in a known radiation field to provide the correlation necessary between chamber voltage and dose received. Calibration may be done by standard means as with other beta indicating instruments. We have developed a preferred calibration cell, described in "Nucleonics," February 1957, p. 85, which includes a thin wall plastic exposure chamber into which the dosimeter may be inserted and which may be surrounded with a dilute solution of a radioisotope. The dose rate in the cavity inside the solution is accurately known from theoretical considerations of specific activity and the Bragg-Gray principle, and the dose rate may be checked further using the cavity as an ionization chamber. The dosimeter to be calibrated may be inserted in the cavity for measured lengths of time to get the percent of the true beta dose that a given dosimeter reads when it is irradiated with the absorbed spectrum from a given radioisotope.

It will be noted that if the beta radiation energy is high, multiplying the dosimeter reading by a factor of 2 will over-estimate the radiation because some radiation will penetrate the outer wall area. Use of this factor of 2 accordingly provides a safety factor built into the device for energies of different levels.

Thus it will be appreciated by those versed in the art that we have for the first time provided a reasonably strong, yet small and lightweight personnel dosimeter which is responsive to dangerous ionizing radiations of both beta and gamma types. The dosimeter, while strong enough for field use, will allow the relatively weak beta rays to enter the ionization chamber and provide a measurement of the dose to human tissue which results from the exposure to the incident radiation.

Having described our invention, we claim:

1. A dosimeter sensitive to both gamma and beta radiation comprising an electrically conductive tubular member formed from a material of thickness corresponding to a surface density substantially 7 milligrams per square centimeter, an electrode disposed axially within said tubular member and insulated therefrom to maintain a potential impressed between said electrode and said tubular member, and a cylindrical perforated shield provided with a known percentage of void area disposed concentrically about said tubular member, said shield being formed from a material chosen from the group consisting of aluminum, magnesium and their alloys which contain not more than approximately 5% of elements of atomic number higher than 13, the dose actually received being at most the gamma dose plus the beta dose indicated by discharge of said dosimeter divided by said known percentage.

2. A dosimeter sensitive to both gamma and beta radiation comprising an electrically conductive paper cylinder having a wall thickness of substantially 7 milligrams per square centimeter, an electrode disposed axially within said cylinder, electrical insulators disposed at opposite ends of said electrode and contacting said paper cylinder, and a cylindrical perforated shield formed from a material chosen from the group consisting of aluminum, magnesium and their alloys which contain not more than approximately 5% of elements of atomic number higher than 13, disposed concentrically about said paper cylinder, said shield including a known percentage of void area, the dose actually received being at most the gamma dose plus the beta dose indicated by discharge of said dosimeter divided by said known percentage.

3. A dosimeter sensitive to cumulative gamma and beta radiation comprising a plastic cylinder provided with an electrically conductive coating, the wall thickness of said plastic cylinder plus said coating being substantially 7 milligrams per square centimeter, an electrode disposed axially within said cylinder and insulated therefrom to maintain a potential impressed between said electrode and said cylinder, and a cylindrical perforated shield provided with a known percentage of void area and formed from a sheet of metal selected from the group consisting of aluminum, magnesium, and their alloys which contain not more than approximately 5% of elements of atomic number higher than 13, the dose actually received being at most the gamma dose plus the beta dose indicated by discharge of said dosimeter divided by said known percentage.

4. A dosimeter responsive to both gamma and beta radiation comprising an ionization chamber including a first axial electrode and a concentric paper cylinder provided with an electrically conductive coating, electrical insulators disposed between said electrode and said coating to maintain a potential impressed therebetween from an external source, and a cylindrical shield provided with substantially 50% void area disposed concentrically about said ionization chamber, said shield being formed from a sheet of metal selected from the group consisting of aluminum, magnesium and their alloys which contain not more than approximately 5% of elements of atomic number higher than 13, the dose actually received being at most the gamma dose plus twice the beta dose indicated by discharge of said dosimeter.

5. A pocket dosimeter comprising a first perforated cylinder formed from a sheet of material selected from the group consisting of magnesium, aluminum, and their alloys containing not more than approximately 5% of elements of atomic number higher than 13, said sheet including a known percentage of void area, a central electrode disposed axially within said first cylinder, a second cylinder having at least an inner surface which is electrically conductive disposed concentrically about said electrode, electric insulators disposed between said electrode and said second cylinder to maintain an impressed potential therebetween, and a third cylinder disposed concentrically about said second cylinder, the combined wall thicknesses of said second and third cylinders being substantially 7 mg./cm.$^2$, the dose actually received being at most the gamma dose plus the beta dose indicated by discharge of said dosimeter divided by said known percentage.

References Cited in the file of this patent

UNITED STATES PATENTS

| | | |
|---|---|---|
| 2,617,955 | Mandeville et al. | Nov. 11, 1952 |
| 2,675,483 | Leighton et al. | Apr. 13, 1954 |